P. C. & O. FLAGSTAD.
MACHINE FOR MAKING PASTRY CONES.
APPLICATION FILED MAR. 15, 1909.
1,200,600.
Patented Oct. 10, 1916.
4 SHEETS—SHEET 4.
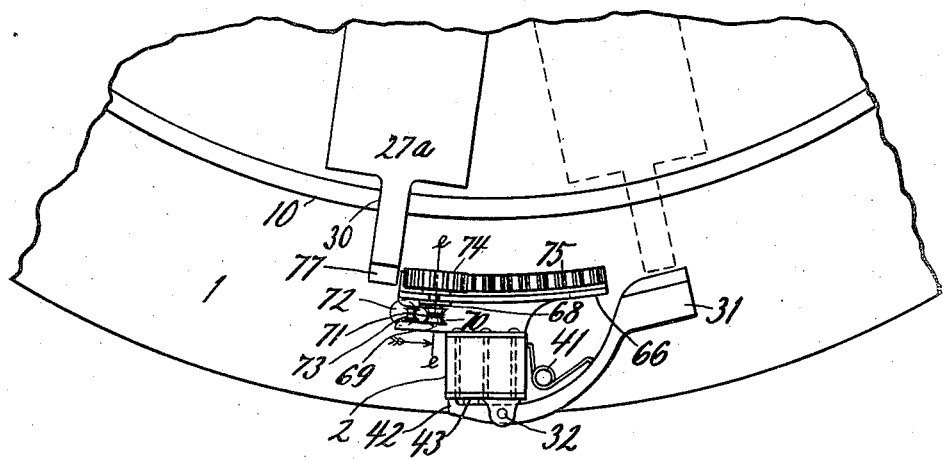
FIG. 11.
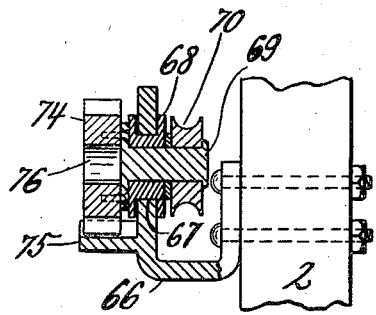
FIG. 12.
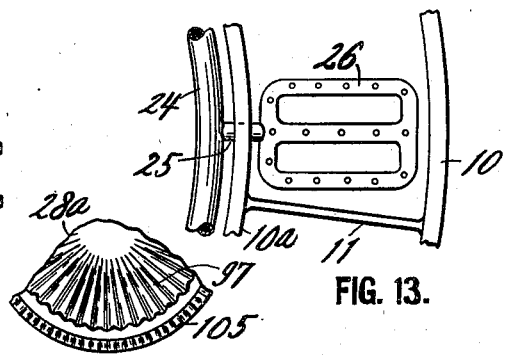
FIG. 13.
FIG. 17.
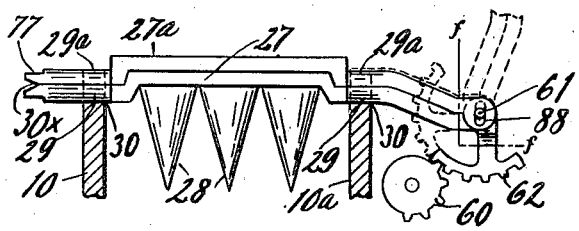
FIG. 14.
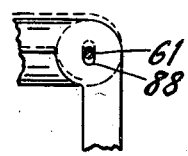
FIG. 15.
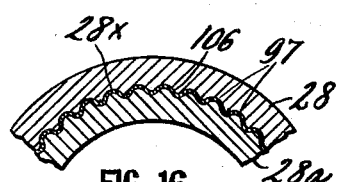
FIG. 16.
WITNESSES:
D. E. Carlsen.
M. M. Carlsen.
INVENTORS:
P. Cornit Flagstad & Oscar Flagstad.
BY their ATTORNEY:
A. M. Carlsen

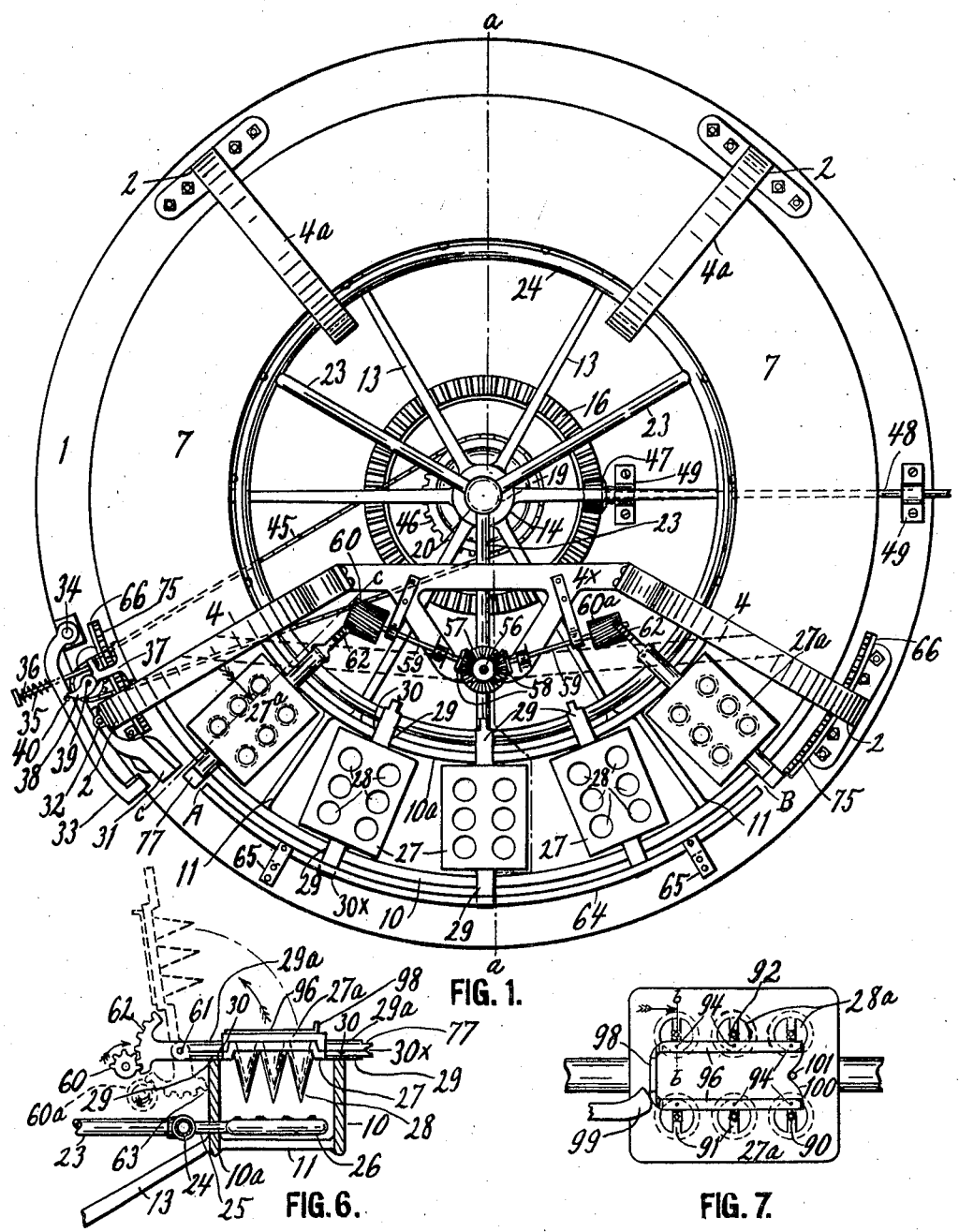

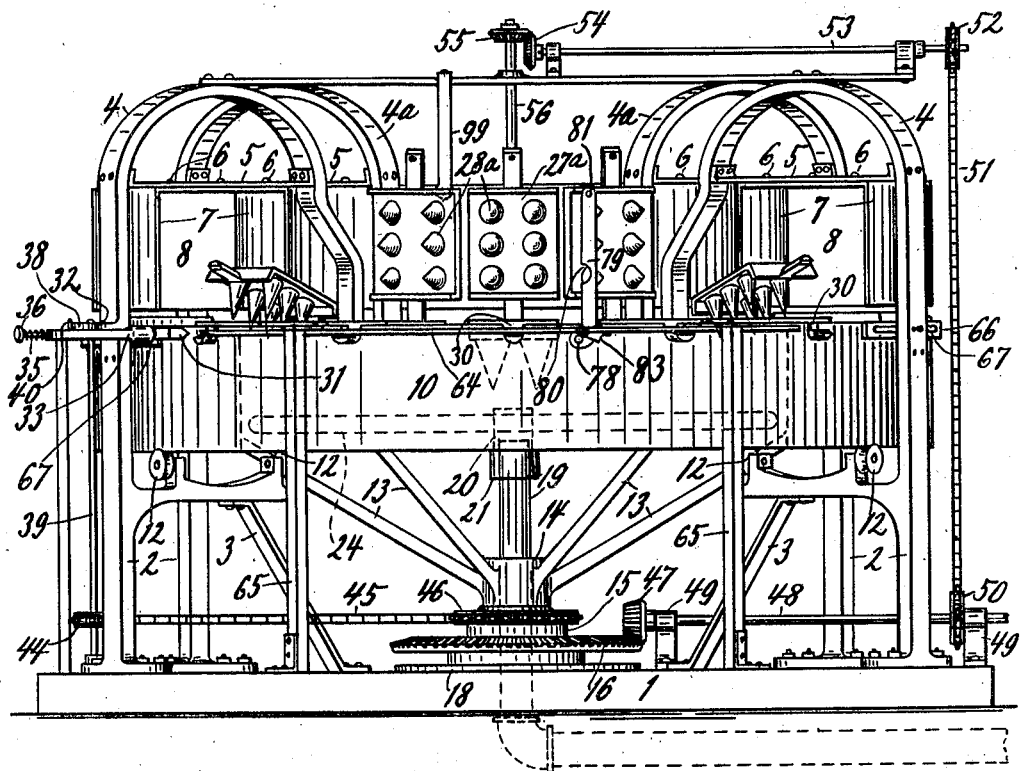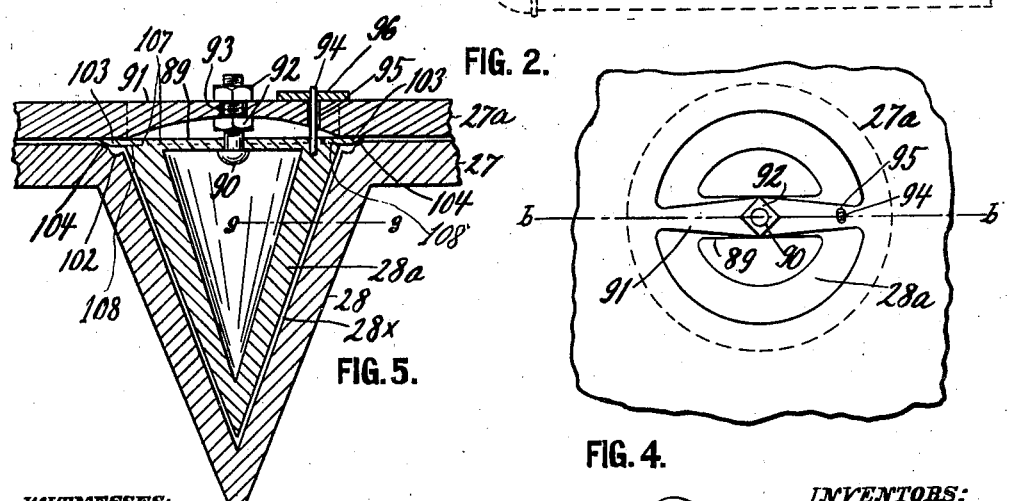

UNITED STATES PATENT OFFICE.

PETER CORNIE FLAGSTAD AND OSCAR FLAGSTAD, OF ST. PAUL, MINNESOTA, ASSIGNORS, BY MESNE ASSIGNMENTS, TO ROBERT G. CARGILL AND FREDERICK W. PEPPER, BOTH OF MINNEAPOLIS, MINNESOTA.

MACHINE FOR MAKING PASTRY CONES.

1,200,600. Specification of Letters Patent. Patented Oct. 10, 1916.

Application filed March 15, 1909. Serial No. 483,488.

*To all whom it may concern:*

Be it known that we, PETER CORNIE FLAGSTAD and OSCAR FLAGSTAD, citizens of the United States, residing at St. Paul, in the county of Ramsey and State of Minnesota, have invented a new and useful Machine for Making Pastry Cones, of which the following is a specification.

Figure 3:
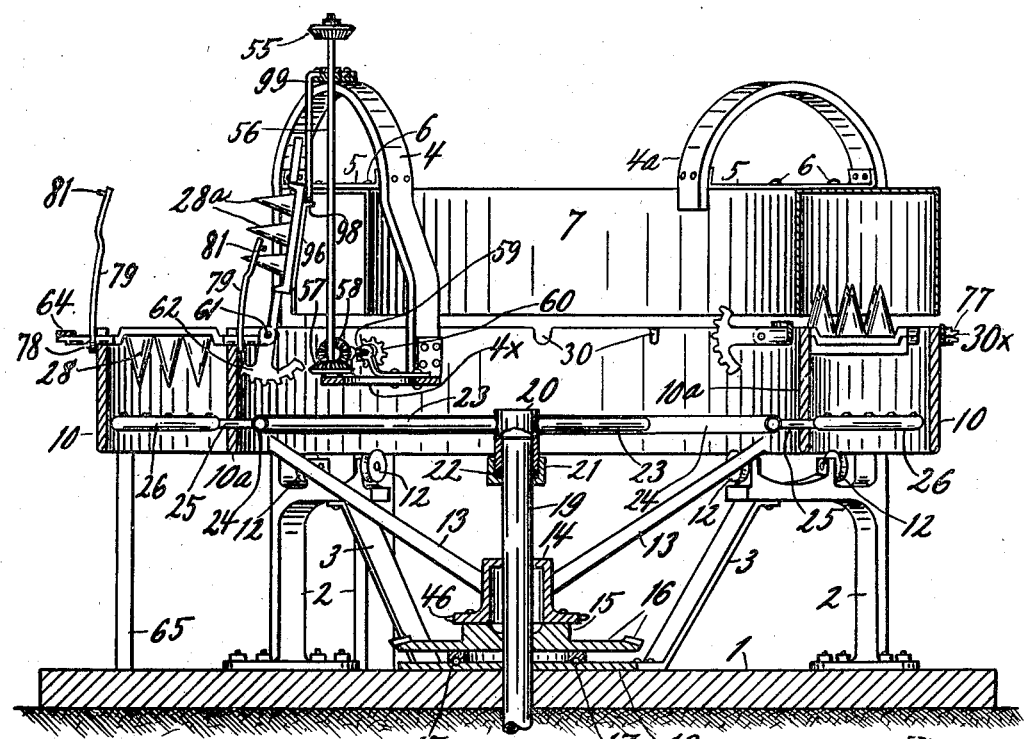
Figures 8, 9:
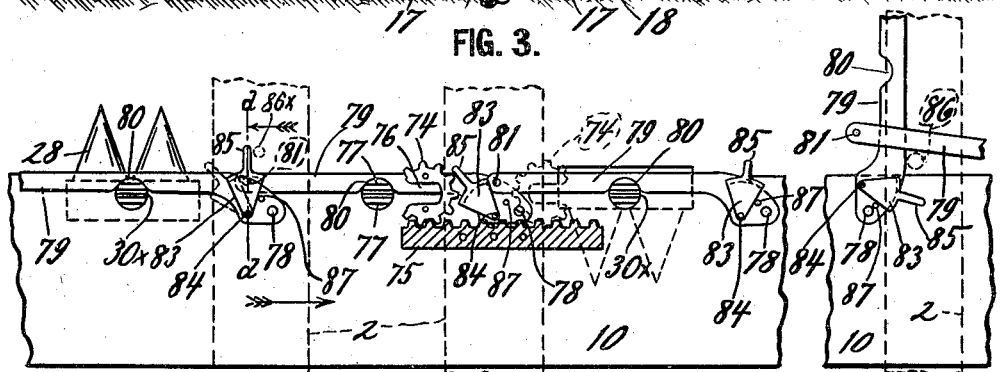
Figure 10:
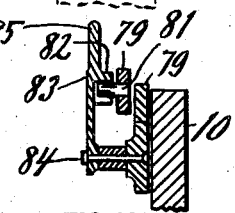

This invention relates to machines for making hollow pastry cones or similar cups of pastry for containing ice-cream to be eaten therewith; and the object is to provide a novel, partly automatic, power-operated machine for rapid and cheap production of said articles of pastry, and to make such machine of unusual efficiency. These and other objects are attained by the novel construction and arrangement of parts illustrated in the accompanying drawings, in which, Figure 1 is a top or plan view of the machine with some of the upper mold members in the front part of the machine removed and such parts omitted as the small scale used would not permit showing clearly. Fig. 2 is a front elevation of the machine with the front mold members restored but shown in raised position away from the lower mold members. Fig. 3 is a vertical section about as on the line $a$—$a$ in Fig. 1. Fig. 4 is a detail top view of a portion of one of the molding devices for the pastry cones. Fig. 5 is a section on line $b$—$b$ in Fig. 7 or of Fig. 4 with a rocker device added upon the right hand end. Fig. 6 is a section about as on the line $c$—$c$ in Fig. 1. Fig. 7 is a top view of one of the molding devices with a rocking device upon it for rocking the cone-molds to loosen them from the baked pastry. Fig. 8 is a side elevation of a portion of a large or main wheel turning in horizontal plane and carrying the cone molds, and means in section for turning the molds upside down and for holding them firmly closed before and after such turning and means for allowing them to open when at the front of the machine. Fig. 9 is a portion of Fig. 8 with two of the levers or means that hold the molds closed, in open position. Fig. 10 is a section on line $d$—$d$ in Fig. 8. Fig. 11 is an enlargement of certain parts in the lower left side portion of Fig. 1. Fig. 12 is an enlarged section on line $e$—$e$ in Fig. 11. Fig. 13 is a top view of one of the gas burners of the machine with adjacent gas piping and portions of the main wheel. Fig. 14 is a modification of the upper portion of Fig. 6. Fig. 15 is an enlarged portion as to the right of line $f$—$f$ in Fig. 14. Fig. 16 is a section on line $g$—$g$ in Fig. 5. Fig. 17 is a fraction of one of the male cone molding members looking from the apex toward its base.

Referring to the drawings by reference numerals, 1 designates the base of a main frame consisting mainly of circularly arranged posts 2, steadied by braces 3 and having at their upper ends arms 4 and 4ª directed for some distance toward the middle of the base and then downward. There may be any desired number of these arms, or arches as they look like in the present illustration, but we have shown only four as that is enough for explanation of the machine. In each arch is fixed a horizontal bar 5 which by bolts 6 hold the roof of a suspended sheet metal oven 7, which forms about three-fourths of a circle and is open at the bottom and at both ends (see 8 in Fig. 2), where it is provided with suspended hinged doors (which are in this case not shown because they have been shown and described in another application lately filed by us).

Close below the open base of the oven rotates in horizontal plane a large main wheel, whose ring is double, forming two concentric rims 10—10ª, which are united by radial braces 11 and have the lower edges guided by grooved rollers 12 mounted on the frame. Said double ring of the wheel is connected by downwardly slanting spokes 13 to a hub 14, which is fixed to and rests upon the hub 15 of a bevel gear 16, which is mounted to rotate on ball bearings 17 in a plate 18 fixed on the base. Centrally through said ball bearing and wheel hub is loosely inserted a vertical gas supply pipe 19, upon whose upper end is revolubly fitted a cap 20, which has its lower end made air tight about the pipe 19 by a stuffing box 21 and packing 22 therein (see Fig. 3). From the upper part of the cap extend radial horizontal pipe branches 23, whose outer ends supply a circularly bent gas pipe 24, from which extend through the rim 10ª a series of nipples 25, each of which supplies a gas burner 26 in the annular space between the rims of the wheel; and directly above each burner is mounted one of the molds in which a series of pastry cones are formed and baked. Said molds are each composed of two plates or members 27—27ᵃ of which the member 27 carries the female cones 28 and is provided with opposite half-round journals 29 resting at all times in open bearings 30 in the upper edges of the rims 10—10ᵃ, the other member 27ᵃ carries the male cones 28ᵃ, which when inserted in the female cones form intervening spaces 28ˣ in which the pastry cones are formed and baked. Each of the normally upper members 27ᵃ is also provided with half-round journals 29ᵃ, which together with the similar journals 29 form cylindrical split journals for the mold.

As best shown in Figs. 14 and 6, each outer journal is formed with a V-shaped notch 30ˣ, into which a wedge 31, swinging on a pivot 32 is driven by a quick blow of a hammer 33, which is pivoted at 34 to the frame and actuated by a spring 35 encircling a bolt 36 which passes loosely through a hole (not shown) in the hammer handle and has its inner end fixed in a portion 37 of the frame. The hammer is swung outward by a cam 38 fixed on a vertical shaft 39 and acting against a pin 40 on the hammer, so that when the cam passes the pin the spring 35 swings the hammer inward and striking a light blow on the wedge, the latter starts the mold members from each other and has the effect of loosening the pastry cone from both of them just before the members are more fully separated, as will presently be further described. A spring 41 (see Fig. 11) holds the wedge and the hammer in normal position. In said position the rear end 42 of the wedge touches against the bracket 43 holding the wedge, whereby the wedge is held in such a position that it will force the mold members open if it should happen that the pastry holds them so stuck together that the blow of the hammer fails to open them.

The shaft 39 is suitably journaled in the frame and provided with a sprocket 44 (see Fig. 2) driven by a link belt 45 and a sprocket 46 fixed on the hub of the main wheel; and the latter is driven by a bevel pinion 47 meshing with the bevel gear 16 and turned by a drive shaft 48, on which it is fixed, the drive shaft being journaled in bearings 49 and driven by any power transmitting means and power (not shown).

On the drive shaft is also fixed a sprocket 50, driving link belt 51 and thereby a sprocket 52 and a shaft 53 journaled horizontally in the top of the frame and having a bevel gear 54 rotating a bevel gear 55, which is fixed on the upper end of a vertical shaft 56, at whose lower end is fixed a bevel gear 57 (see Figs. 1 and 3). The latter wheel engages and turns two bevel gears 58 fixed one on each of two shafts 59 which are journaled to a frame portion 4ˣ, held by the inner ends of the front arches 4. Said shafts carry one of them a comparatively long cog pinion 60 and the other a similar pinion 60ᵃ, which by the gearing just described are rotated in opposite directions.

The inner journal of each mold has its two members pivoted together as at 61 in Fig. 6 and the upper member extends beyond the joint and is provided with a toothed sector 62, which when it passes the pinion 60 is engaged by it and the upper mold member is thereby swung on its pivot 61 to an upright or rather inwardly leaning position, the sector stopping against the rim 10ᵃ, as at 63 in Fig. 6, in which position it remains until the baked pastry cones are removed and fresh pastry placed in the lower mold member. The pinion 60ⁿ then engages the sector and closes the upper mold member down into proper position on the lower member. To hold the lower member still during this operation, a laterally curved rail 64 is fixed on posts 65 along the front of the machine and engages the flat upturned side of the outer journal of each lower mold member while it passes as from A to B in Fig. 1.

Shortly before each mold is opened it is turned on its journals to present the male member upward and shortly after the mold is filled with paste from a tank (not shown) arranged above the front portion of the machine, it is turned on its trunnions with the male member downward so as to present it to the burner during the greater portion of the mold's travel with the main wheel. To effect the said turning of each mold we provide upon the front portion of the main frame, near the ends of the rail 64, two turning devices which are so similar that only one of them needs to be described. It consists of a bracket 66 (see Figs. 11 and 12) having a horizontal slot 67, in which is guided to slide a journal bearing 68 with a short shaft 69 in it and having affixed to one end a pulley 70 with a cord 71 partly wound on it and provided at its outer end with a weight 72, the cord being guided to the weight by a sheave 73 mounted on the bracket. At the inner end of the shaft 69 is fixed a small gear wheel 74 engaging a rack 75 formed on the bracket below its slot. Said gear has in one side a gap 76 (see Fig. 8) into which the large wheel moves the flattened portion 77 of the outer journal of the mold, and as the journal reaches the bottom of the gap the further movement of the journal causes the gear to roll on the rack half a turn to the position shown in dotted lines 74, where the journal, after receiving half a turn, passes out of the gap and the weight 72 at once returns the gear to normal position ready to receive the next journal and turn it in like manner as just described.

The molds are held firmly closed by the following means (best shown in Figs. 8, 9 and 10): Upon each rim 10—10ª of the main wheel is pivoted at 78 a series of levers 79, which being all alike, only one or two of them need be described. Each lever has a notch 80 adapted to bear upon the adjacent split journal of a mold and hold the two mold members firmly together. To accomplish this, each lever is near its free end provided with a lateral pin 81 (see Fig. 10) adapted for engagement with the segmental wing 82 of a locking cam 83, which is pivoted at 84 to each lever and is provided with a finger 85, which by passing against a pin 86ˣ on the frame, as to the left in Fig. 8, disengages the cam from the pin 81 of the lever nearest to the right, so as to allow the lever to be raised by the upper half of the journal when the latter is raised, as already described, and shown farther to the right in said Fig. 8 and when the molds have been emptied, filled and closed again, the raised lever is by a peg 86 on the frame (see Fig. 9) brought down upon the journal and pressed down sufficiently for the locking cam 83 to engage the pin 81. 87 is a pin in each lever to carry the cam along as it is forced upon the pin 81 of the next lever.

In the modification Figs. 14 and 15 is shown how one of the mold members has a vertically slotted hole 88 on the pin 61, which as the gear 60 engages the toothed sector 62 permits the gear to raise the upper mold member slightly before swinging its outer end upward. This is to facilitate the separation of the cone molds without injury to the pastry cones.

In Figs. 4, 5, 6 and 7 is shown how the male cone 28ª is hollow inside and has a bridge bar 89, in which swivels the headed end of a bolt 90, whose body is inserted upwardly through a bridge bar 91 of the member 27ª and held firmly therein by two jam nuts 92, the upper bridge having its hole 93 larger than the bolt so as to be able to adjust the male cone centrally in the female cone before the nuts 92 are tightened. The male cone is provided with a pin 94 projecting upward through a slot 95 in the member 27ª, or its bridge, and is engaged by a rotating device 96, (see Fig. 7) which in the latter view is shown as being U-shaped and engaging six pins 94 for rocking that many cones and thereby loosen the pastry cones, which otherwise are often very troublesome to dislodge quickly from the molds. The rotating may, however, be so slight as not to interfere with but rather to be benefited by the longitudinal grooves or corrugations 97 of the cone molds shown in Fig. 16, and which are mainly to prevent cracking of the pastry cones during storage and shipping. The rotating device may be operated by a push of the hand at the loop 98 of it, but when applied to an automatic machine, similar to the one described, the frame is provided with a fixedly projecting actuator 99 (see Figs. 7 and 3) which imparts a push to each rotating device passing it, and after the actuator is passed the rotating device is restored to normal position by a spring 100, acting between a pin 101 and the ends of the rotating device.

In Fig. 5 it will be seen that the female cone has an annular groove 102 by which to form a strengthening rim about the upper end of the pastry cone; and to enable the pastry cone to be easily detached from the usual web of pastry baked between the cone-holding members, the male cone is provided with a flange 103, which covers said annular groove and beyond the same is beveled at 104, which beveled face comes almost in contact with the plate 27 just beyond the annular groove, so as to weaken the pastry close by the rim of the pastry cone. To further insure such breakability the beveled face 104 is corrugated, as shown at 105 in Fig. 17 so as to perforate the paste at the breaking line.

As already mentioned and shown in Fig. 16, the adjacent faces of the two cone molds are provided with longitudinal corrugations which make the pastry cone 106 corrugated both inside and outside and thereby expansive, a feature which makes the cone attractive as to its external appearance and, as experience has demonstrated, it makes it much more durable to handle and store without cracking from shrinkage or by being telescoped one cone outside the other. The expansiveness also makes the pastry cone easily removable from the core of the mold on which it is shrunk by being dried in the baking, a difficulty which makes the ordinary cones expensive in labor and breakage already at the baker's hands besides in shipping as already stated.

As indicated by the lines 107 in Fig. 5, the flange 103 may be a sheet metal ring retained loosely in an annular recess 108 in the male cone, or it may be secured to its mold member 27ª, or cast integral with either said member or with the male cone. Either arrangement will weaken the pastry or dough at the breaking line, and the corrugations or notches in one of the parts will permit escape of steam from the mold, but for purpose of cutting the pastry cones entirely loose from the pastry by rocking one of the cone molds, the corrugations should be on the part that is rocked.

What we claim is:

1. In a machine for the purpose set forth, male and female cone-molding members, each provided with longitudinal grooves or corrugations upon their adjacent surfaces, and means for rocking one of the mold members relatively to the other.

2. In a machine for the purpose set forth, two members or plates movable from and toward each other, female cone molds carried by one of the members, male cone molds carried by the other member and adapted to enter the female cone molds, said other member having apertures each with a bridge bar across it and said male cone molds being hollow and provided with a bridge bar across its large end, a bolt swiveled in the middle of the bridge bar of each cone mold, passed loosely through the bridge bar in the plate and having jam nuts one below and the other at the top of the bridge bar, and means for rocking simultaneously all the cone molding members mounted on the plate.

3. In a machine for the purpose set forth and mounted in a frame, molding devices comprising each two members or plates, cone-molding members carried thereby and adapted to fit into each other and form intervening spaces for pastry cones, said plates being hinged together at one end and one of them provided with a toothed sector, two gear wheels rotated in opposite directions and engaging the sector, one to open the plates and the other to close them, and a wheel carrying the molding devices into and out of engagement with said gear wheels.

4. In a machine for the purpose set forth and mounted in a frame, molding devices comprising each two members or plates, cone-molding members carried thereby and adapted to fit into each other and form intervening spaces for pastry cones, said plates being hinged together at one end and one of them provided with a toothed sector, two gear wheels rotated in opposite directions and engaging the sector, one to open the plates and the other to close them, and a wheel carrying the molding devices into and out of engagement with said gear wheels, one of the pivoted plates having its hole or holes on the pivot joints slotted, so as to permit the gear wheel to raise one of the plates some before tilting it away from the other plate.

5. In a machine for the purpose set forth, a frame, a main wheel mounted in the frame, molds carried by the wheel and being made each in two sections adapted for baking pastry cones between them, a wedge pivotally mounted on the frame and adapted to separate the members, a spring-actuated hammer arranged to strike on the wedge, a power transmitting mechanism rotating the main wheel, and a cam operatively connecting with the power mechanism for raising the hammer after each blow it strikes, said molds having at their parting line a notch for the wedge to enter, a spring for returning the wedge to normal position, and means to stop such return movement at a point where the wedge will force the members apart if the blow should in some cases fail to do it.

6. In a machine for the purpose set forth, the combination with separable mold members having a notch at their parting line, of a yieldingly mounted wedge and a spring-actuated hammer arranged to drive the wedge into the notch.

7. In a machine for the purpose set forth and mounted in a frame, molding devices comprising each two members or plates, cone-molding members carried thereby and adapted to fit into each other and form intervening spaces for pastry cones, said plates being hinged together at one end and one of them provided with a toothed sector, two gear wheels rotated in opposite directions, one engaging the sector to open the plates and the other to close them, and a wheel carrying the molding devices into and out of engagement with said gear wheels, said wheel rotating in a horizontal plane and having two concentric rims with bearing notches in their upper edges, and said plates having longitudinally separable journals resting in said bearings, a laterally curved rail portion mounted on the frame and arranged to hold the outer journals of each of the lower plates down in its bearing while the upper plate is raised and lowered by the sector and gear wheel and while it remains raised.

8. In a machine for the purpose set forth, and mounted in a suitable frame, a main wheel turning in a horizontal plane and having a double rim with intervening annular space and open bearings in the upper edges of the rims, baking molds mounted between the rims and having journals resting in the bearings, one of said journals of each mold having a flattened portion projecting beyond the rim, turning devices mounted on the frame for imparting half a turn to the mold as it passes each device; said device comprising a horizontally slotted bracket fixed on the frame and having a rack adjacent its slot, a journal block sliding in the slot, a short shaft in the journal block and having affixed on one end a gear wheel engaging in the rack and provided with a radial gap adapted to receive the flat end of the journal of the mold, and at its other end a pulley, a cord partly wound on the pulley and having a weight attached to its other end, and a guide pulley on the bracket engaging the cord to hold it at all times in plumb position to the weight so the latter does not have to move horizontally with the winding pulley, and gas burners arranged below the molds.

9. In a machine for the purpose set forth and mounted in a suitable frame, a main wheel turning in a horizontal plane and having two concentric rims with intervening annular space and open bearings in their upper edges, molds disposed in the annular space and having journals resting in the open bearings, said molds being each with its journals divided into two members, of which the normally upper one is movable to and from the lower one, means for moving the upper member from and toward the lower member, levers pivoted each with one end to the main wheel and arranged to bear upon the journals to press the mold members together, each of said levers having near its pivoted end a pivotally mounted locking cam and near its free end a pin adapted for engagement with the locking cam on the next lever, an obstruction on the frame for retarding the locking cam and thereby disengage it from the pin in the lever when the latter is to raise and permit separation of the mold members, and obstructive means on the frame for returning the levers to pressing position on the molds and to automatically lock each other by the locking cams.

10. In a machine for the purpose set forth, a base with a frame on it, a main wheel turning in a horizontal plane within the frame and having its hub journaled on the base and its rim connected with the hub by inclined spokes, rollers on the frame for guiding the rim, baking molds carried by the rim, a gas supply pipe extending centrally up through the base and the wheel hub, and having above the hub a rotatable cap, gas burners carried by the rim of the wheel below the molds and connected with the cap of the gas supply pipe.

11. In a machine for the purpose set forth, a base with a frame on it, a main wheel turning in a horizontal plane within the frame and having its hub journaled on the base and its rim connected with the hub by inclined spokes, rollers on the frame for guiding the rim, baking molds carried by the rim, a gas supply pipe extending centrally up through the base and the wheel hub, and having above the hub a rotatable cap, gas burners carried by the rim of the wheel below the molds and connected with the cap of the gas supply pipe, said frame having arches or arms extending inward over and downward within the rim of the main wheel, a secondary frame supported by said arms within the rim of the wheel, a mechanism mounted on the secondary frame for opening and closing the molds, a drive shaft operatively connected with the main wheel and with the mechanism for closing and opening the molds.

12. In a machine for the purpose set forth, a frame, a wheel mounted to rotate in the frame, baking molds carried by the wheel and comprising each a series of cone-shaped outer mold members and cone-shaped inner members having a slight rotating movement in the outer members, a rotating device engaging all the inner cone molds in each main mold to rotate them simultaneously, a spring holding the rotating device in normal position and a cam fixed on the frame work of the machine for actuating the rotating device against the resistance of the spring.

13. In a machine for the purpose set forth, a frame, a wheel mounted to rotate therein, baking molds carried by the wheel, gas burners carried by the wheel below each mold, means for supplying the burners with gas and means for turning the molds automatically over the burners while the wheel and molds are in motion.

14. In a machine for the purpose set forth, a wheel mounted to rotate therein, baking molds carried by the wheel, gas burners carried by the wheel below each mold, means for supplying the burners with gas and means for turning the molds automatically over the burners while the wheel and molds are in motion, and automatic means for opening and closing the molds while the wheel and molds are in motion.

15. In a device for the purpose set forth, interfitting molds for pastry cones, said molds having near the base of the cone annular meeting portions adapted to come closer together than the mold portions farther from the cone, said meeting portions being notched to form teeth, and means for rotating one of the mold members and thereby causing the teeth to sever the baked pastry cones from the adjacent pastry.

16. In a device for the purpose set forth, interfitting molds for pastry cones, said molds having about the base of the cone annular meeting portions coming closer together than the parts of the mold farther from the cone, one of said meeting portions having notches or corrugations for the escape of steam and hot air, and to prevent premature entire separation of the pastry cones from the dough beyond them, and means for detaching the pastry cones from the baked dough by rocking one of the cone molds about its axis.

17. In a device for molding and baking hollow pastry cones, a mold, a core arranged to enter the mold to form a hollow pastry cone between it and the mold, and means for applying baking heat to the mold, said core having a rotary movement to overcome the sticking of the pastry on the core caused by the baking heat, thus enabling the core to be pulled out of the baked pastry without tearing the latter.

18. In a device for molding and baking hollow pastry cones, a primary plate having a series of hollow cone molds, a secondary plate, a series of conic cores rotatably mounted on the secondary plate, and means for bringing the plates to and from each other, an actuating device mounted on the secondary plate and connected with the thick end of each core beyond its center, whereby a single movement of the actuating device will impart rotary movement to all the cores simultaneously.

In testimony whereof we affix our signatures, in presence of two witnesses.

P. CORNIE FLAGSTAD.
OSCAR FLAGSTAD.

Witnesses:
A. M. CARLSEN,
THEODORE LANDER.